(12) United States Patent
Lutnick et al.

(10) Patent No.: US 8,301,540 B2
(45) Date of Patent: Oct. 30, 2012

(54) NEUTRAL PRICE IMPROVEMENT

(75) Inventors: Howard W. Lutnick, New York, NY (US); Michael Sweeting, Aldershot (GB)

(73) Assignee: BGC Partners, Inc., New York, NY (US)

( * ) Notice: Subject to any disclaimer, the term of this patent is extended or adjusted under 35 U.S.C. 154(b) by 875 days.

(21) Appl. No.: 11/238,422

(22) Filed: Sep. 28, 2005

(65) Prior Publication Data

US 2006/0069637 A1 Mar. 30, 2006

Related U.S. Application Data

(60) Provisional application No. 60/613,830, filed on Sep. 28, 2004.

(51) Int. Cl.
*G06Q 40/00* (2006.01)
*G06Q 30/00* (2006.01)
(52) U.S. Cl. ........... 705/37; 705/26.3; 705/35; 705/36 R
(58) Field of Classification Search .............. 705/35–37, 705/26
See application file for complete search history.

(56) References Cited

U.S. PATENT DOCUMENTS

| | | | |
|---|---|---|---|
| 3,581,072 A | 5/1971 | Nymeyer | |
| 4,677,552 A | 6/1987 | Sibley, Jr. | |
| 4,980,826 A | 12/1990 | Wagner | |
| 5,038,284 A | 8/1991 | Kramer | |
| 5,077,665 A | 12/1991 | Silverman et al. | |
| 5,168,446 A | 12/1992 | Wiseman | |
| 5,297,032 A | 3/1994 | Trojan et al. | |
| 5,787,402 A | 7/1998 | Potter et al. | |
| 5,835,896 A | 11/1998 | Fisher et al. | |
| 5,905,974 A | 5/1999 | Fraser et al. | |
| 5,905,975 A | 5/1999 | Ausubel | |
| 5,924,082 A | 7/1999 | Silverman et al. | |
| 5,926,801 A | 7/1999 | Matsubara et al. | |
| 6,134,535 A | 10/2000 | Belzberg | |
| 6,141,653 A | 10/2000 | Conklin et al. | |
| 6,317,727 B1 | 11/2001 | May | |
| 6,363,365 B1 | 3/2002 | Kou | |
| 6,519,574 B1 | 2/2003 | Wilton et al. | |
| 6,560,580 B1 | 5/2003 | Fraser et al. | |

(Continued)

FOREIGN PATENT DOCUMENTS

| | | |
|---|---|---|
| EP | 1006471 | 6/2000 |
| EP | 1006472 | 6/2000 |
| WO | WO 00/26745 | 5/2000 |

OTHER PUBLICATIONS

Battalio et al., "Does the Limit Order Routing Decision Matter?", 2002, Oxford University Press. vol. 15, No. 1, pp. 159-194.*

(Continued)

*Primary Examiner* — Ryan D Donlon

(57) ABSTRACT

Electronic trading systems and methods are provided that permit traders to submit price improvement orders that are traded at predetermined pricing increments and that maintain a position in a trading stack based on the size of other orders already existing in the stack at the time the order is submitted. This type of price improvement relates to neutral price improvement according to the invention. Neutral price improvement represents an option that permits a trader to opt out of being subjected to the trading rules and/or scheme governing a particular feature (e.g., price improvement), yet still permit traders to engage in competitive trading. In such a system, the trading rules may be applied generally to all orders in the system, except for orders submitted with the neutral price improvement option.

25 Claims, 13 Drawing Sheets

U.S. PATENT DOCUMENTS

| | | | |
|---|---|---|---|
| 6,618,707 | B1 | 9/2003 | Gary |
| 7,020,632 | B1 | 3/2006 | Kohls et al. |
| 7,155,410 | B1 | 12/2006 | Woodmansey et al. |
| 7,246,093 | B1 | 7/2007 | Katz |
| 7,343,341 | B2 | 3/2008 | Sandor et al. |
| 7,392,214 | B1 | 6/2008 | Fraser et al. |
| 7,406,444 | B2* | 7/2008 | Eng et al. ............... 705/37 |
| 7,574,395 | B2 | 8/2009 | Sweeting |
| 7,752,116 | B2* | 7/2010 | Ascher et al. ............ 705/37 |
| 8,019,672 | B2* | 9/2011 | Sweeting et al. ......... 705/37 |
| 8,108,295 | B2* | 1/2012 | Bok et al. ................ 705/37 |
| 2001/0042040 | A1* | 11/2001 | Keith ....................... 705/37 |
| 2002/0077962 | A1* | 6/2002 | Donato et al. ........... 705/37 |
| 2002/0095369 | A1 | 7/2002 | Kaplan et al. |
| 2002/0116314 | A1 | 8/2002 | Spencer et al. |
| 2002/0169703 | A1* | 11/2002 | Lutnick et al. .......... 705/37 |
| 2002/0198816 | A1 | 12/2002 | Gilbert et al. |
| 2003/0033239 | A1 | 2/2003 | Gilbert et al. |
| 2003/0088495 | A1 | 5/2003 | Gilbert |
| 2003/0126066 | A1 | 7/2003 | Nunes et al. |
| 2003/0229569 | A1 | 12/2003 | Nalbandian et al. |
| 2004/0210511 | A1* | 10/2004 | Waelbroeck et al. .... 705/37 |
| 2004/0236669 | A1 | 11/2004 | Horst et al. |
| 2004/0243505 | A1* | 12/2004 | Sweeting et al. ........ 705/37 |
| 2004/0254804 | A1* | 12/2004 | Peterffy et al. ........... 705/1 |
| 2005/0038732 | A1 | 2/2005 | Sweeting et al. |
| 2005/0055304 | A1 | 3/2005 | Lutnick et al. |
| 2005/0055305 | A1 | 3/2005 | Lutnick et al. |
| 2005/0108125 | A1 | 5/2005 | Goodwin et al. |
| 2005/0125327 | A1 | 6/2005 | Fishbain |
| 2005/0216393 | A1* | 9/2005 | Lutnick et al. ........... 705/37 |
| 2006/0069635 | A1 | 3/2006 | Ram et al. |
| 2008/0071670 | A1* | 3/2008 | Fraser et al. ............. 705/37 |
| 2008/0071671 | A1* | 3/2008 | Fraser et al. ............. 705/37 |
| 2008/0077523 | A1* | 3/2008 | Fraser et al. ............. 705/37 |
| 2009/0094136 | A1 | 4/2009 | Ausubel |
| 2009/0281954 | A1 | 11/2009 | Waelbroeck et al. |

OTHER PUBLICATIONS

Bessembinder, Hendrik "Trade Execution Costs and Market Quality after Decimalization", Journal of Financial and Quantitative Analysis vol. 38, No. 4, Dec. 2003.*

Rosenblum, Daniel, "Allocation of Waiting Time by Trading in Position on a G/M/S Queue", Journal of Institute for Operations Research, 1992, S338-S342.*

USPTO Office Action for U.S. Appl. No. 10/938,143, dated Jun. 23, 2011 (16 pages).

EPO Summons to Attend Oral Proceedings for European Application No. 04255492.3, dated Jul. 6, 2011 (6 pages).

USPTO Pre-Brief Appeal Conference Decision for U.S. Appl. No. 10/938,143, dated Jan. 24, 2012 (2 pages).

USPTO Advisory Action for U.S. Appl. No. 10/938,143, dated Feb. 7, 2012 (4 pages).

EPO Decision for European Application No. 04255492.3, dated Oct. 24, 2011 (4 pages).

International Search Report and Written Opinion for International Application No. PCT/US06/25410, dated May 29, 2008 (5 pages).

AU Examination Report for Application No. 2006263658; dated Mar. 30, 2009 (2 pages).

Paul Laird, "MarkAir Comes of Age," Alaska Business Monthly, Anchorage, Oct. 1986, vol. 2, Iss. 10, Sec. 1, p. 28.

USPTO Office Action for U.S. Appl. No. 10/890,602, dated Feb. 2, 2010 (19 pages).

USPTO Office Action for U.S. Appl. No. 10/938,143, dated Aug. 7, 2008 (7 pages).

European Supplementary Search Report for EP Application No. 06785863.9; dated Dec. 21, 2009 (5 pages).

USPTO Office Action for U.S. Appl. No. 10/938,143, dated Jan. 13, 2010 (16 pages).

International Preliminary Report on Patentability for International Application No. PCT/US06/25410, dated Jul. 1, 2008 (4 pages).

EPO Supplementary Search Report and Opinion for European Application No. 06785863.9, dated Nov. 30, 2009 (3 pages).

EPO Communication for European Application No. 06785863.9, dated Mar. 30, 2010 (1 page).

U.S. Appl. No. 60/513,664, filed Oct. 22, 2003, Lutnick, et al.

U.S. Appl. No. 60/512,879, filed Oct. 20, 2003, Lutnick, et al.

U.S. Appl. No. 60/502,051, filed Sep. 10, 2003, Lutnick, et al.

U.S. Appl. No. 60/613,830, filed Sep. 28, 2004, Lutnick, et al.

EPO Communication and Search Report for European Application No. 04255492.3, dated Jul. 20, 2006 (5 pages).

* cited by examiner

| ORDER | TYPE | SIZE | PRICE IMPROVEMENT LEVEL (if applicable) |
|---|---|---|---|
| A | Traditional | 5M | |
| B | Neutral | 4M | |
| C | Dynamic | 3M | |
| SORT | | | |
| C | Dynamic | 3M | |
| A | Traditional | 2M | |
| B | Neutral | 4M | |
| A | Traditional | 3M | (PI 1) |

FIG. 1

| ORDER | TYPE | SIZE | PRICE IMPROVEMENT LEVEL (if applicable) |
|---|---|---|---|
| A | Traditional | 5M | |
| B | Neutral | 4M | |
| C | Dynamic | 40M | |
| SORT | | | |
| C | Dynamic | 5M | (PI 1) |
| B | Neutral | 4M | |
| C | Dynamic | 35M | |
| A | Traditional | 5M | (PI 1) |

FIG. 2

| ORDER | TYPE | SIZE | PRICE IMPROVEMENT LEVEL (if applicable) |
|---|---|---|---|
| A | Dynamic | 5M | |
| B | Neutral | 4M | |
| C | Dynamic | 40M | |
| SORT | | | |
| A | Dynamic | 5M | (PI 1) |
| B | Neutral | 4M | |
| A | Dynamic | 40M | (PI 0) |

FIG. 3

| ORDER | TYPE | SIZE | PRICE IMPROVEMENT LEVEL (if applicable) |
|---|---|---|---|
| B | Neutral | 4M | |
| C | Dynamic | 3M | |
| SORT | | | |
| B | Neutral | 4M | |
| C | Dynamic | 3M | (PI 0) |

FIG. 4

| ORDER | TYPE | SIZE | PRICE IMPROVEMENT LEVEL (if applicable) |
|---|---|---|---|
| A | Level One | 5M | (PI 1) |
| B | Neutral | 4M | |
| C | Dynamic | 40M | |
| SORT | | | |
| C | Dynamic | 5M | (PI 2) |
| B | Neutral | 4M | |
| C | Dynamic | 35M | (PI 2) |
| A | Level One | 5M | (PI 1) |
| ORDER A CANCELLED | | | |
| SORT | | | |
| C | Dynamic | 5M | (PI 1) |
| B | Neutral | 4M | |
| C | Dynamic | 35M | (PI 1) |

FIG. 5

| ORDER | TYPE | SIZE | PRICE IMPROVEMENT LEVEL (if applicable) |
|---|---|---|---|
| A | Level One | 5M | |
| B | Neutral | 4M | |
| C | Dynamic | 40M | (PI 1) |
| SORT | | | |
| C | Dynamic | 5M | (PI 2) |
| B | Neutral | 4M | |
| C | Dynamic | 35M | (PI 2) |
| A | Level One | 5M | (PI 1) |
| ORDER C IS CANCELLED | | | |
| A | Level One | 5M | (PI 1) |
| B | Neutral | 4M | |
| SORT | | | |

NEUTRAL PRICE IMPROVEMENT

This application claims the benefit of U.S. Provisional Application No. 60/613,830, filed Sep. 28, 2004, the disclosure of which is hereby incorporated by reference in its entirety.

BACKGROUND OF THE INVENTION

The present invention relates to systems and methods for providing electronic trading systems, and more particularly to trading systems that implement a particular feature such as price improvement.

Electronic trading systems provide a platform for which traders can trade items such as financial instruments (e.g., stocks, bonds, securities, futures, contracts, currency, etc.) or household goods (e.g., old records, antiques, sports cards, etc.). In many of these trading systems, bid/offer-hit/lift processes are used to negotiate a sale of a given item. In connection with such processes, traders may submit bids (i.e., prices they are willing to purchase an item) and/or offers (i.e., prices they are willing to sell an item). A trader may respond to bids or offers by submitting sell (or hit) or buy (or lift or take) commands to the trading system. A trade is executed when a trader issues a hit or lift (or take) command in response to a bid or offer, respectively. In other trading systems bids and offers may be automatically matched when at the same price.

The prices at which bids and offers can be submitted usually conform to some sort of fixed interval or increment, where the interval conforms to an established or agreed practice and is set by the trading system, or dictated by the type or price of item being traded. For example, if a trader is trading United States Treasuries in a brokerage trading system, that trader can submit bid or offer prices that some trading systems vary by $\frac{1}{4}$ of $\frac{1}{32}$nd of a point in Treasuries up to a maturity of under 10 years, and $\frac{1}{2}$ of $\frac{1}{32}$nd of a point for maturities over 10 years and over. In trading systems for stocks and equities, for example, traders can submit bids and offers that vary by a penny.

Trading systems have been developed that permit traders to submit bids or offers that improve on the price of a particular item by improving on the price within the predetermined pricing increments. Such trading systems employ a trading method commonly referred to as price improvement. Examples of trading systems that use price improvement can be found in U.S. patent application Ser. No. 10/826,779, filed Apr. 16, 2004 (hereinafter "the '779 application") and in U.S. patent application Ser. No. 10/171,009, filed Jun. 11, 2002 (hereinafter "the '009 application"), both of which are hereby incorporated by reference herein in their entireties.

In general, price improvement enables one or more traders to improve on a price for an item being traded in a market, without having to improve on the price using the predetermined pricing increment. Traders can improve on the price of an item using different price improvement levels. This allows traders to select among different aggressive price improvement increments to price improve, for example, on a bid, offer, buy, or sell price. For example, the trading system may provide several price improvement levels (e.g., four levels) for which the trader can improve the price. The trading system may use these price improvement levels to determine priority of orders in a stack of bids and offers, but not such that they warrant movement to a new standard predetermined trading price increment.

A price improvement level may improve on a particular price at a fraction of the predetermined pricing increment of the item being traded, with the particular price improvement level being a multiple of the fraction. The fraction of the standard increment may depend on the particular price improvement level chosen (e.g., a price improvement level of one, two, three, etc.). For example, the two-year United States government bond may trade at standard increments of $\frac{1}{4}$ of $\frac{1}{32}$ of a nominal value. Thus, trading two-year U.S. government bonds with price improvement enables a trader to submit an order that slightly improves on a price at a fraction of the ($\frac{1}{4}$ of $\frac{1}{32}$ for a 2 year maturity) predetermined pricing increment. Assuming for example that the price improvement increment is equivalent to one eighth of the predetermined pricing increment, a price improvement level of one may improve the price by one eighth of the ($\frac{1}{4}$ of the $\frac{1}{32}$) predetermined pricing increment, and a price improvement level of three may improve the price by three eighths of the ($\frac{1}{4}$ of the $\frac{1}{32}$) standard increment.

Another price improvement level includes use of dynamic BEST price improvement level (hereinafter "dynamic price improvement"). Orders submitted using dynamic price improvement maintain a predetermined position within a trading stack until matched or cancelled. A dynamic price improvement order has a price improvement level and a timestamp. The price improvement level is a non-traditional price improvement on a traditional price increment such as the level one, two, or three price improvement level, as discussed above. The timestamp indicates the time at which the dynamic order is submitted, and may be used to establish priority over other orders that have the same price improvement level, including other dynamic orders.

A dynamic price improved order can increase or decrease its price improvement level depending on market conditions. This creates a trading scheme in which the dynamic order changes its price improvement level to maintain its position relative to the other orders in the stack, thereby maintaining its position in the stack. For example, if a trader submits a dynamic order and that order is placed at the top of the stack, this order maintains its position at the top of the stack, while the price of the item being traded is maintained at its predetermined price increment price, by adjusting its price improvement level (e.g., increase its price improvement level such that it exceeds the price improvement level of the next best order by one level) until it is matched with a contra order or cancelled.

The dynamic order may increase its price improvement level up to a maximum available price improvement level, at which point it may use its original timestamp to maintain its position at the top of the stack where the timestamp is older than subsequent orders.

The presence, or not, of dynamic price improvement (PI) orders in the stack may cause the system to decrease the price improvement level of certain price improved orders submitted subsequent to dynamic PI orders such that the price improvement level of the dynamic PI orders are not inflated when such inflation is not needed to maintain their respective positions in the stack. Thus, this avoids using unnecessary price improvement levels on orders that cannot improve their position in the stack by virtue of the pre-existing dynamic price improvement order. For example, assume that a dynamic order is in a stack with a price level of two. Then a trader submits a new price improved order with a price improvement level of three, which in this case is assumed to be the maximum price improvement level. Instead of increasing the price level of the dynamic PI order to three, the system may decrease the price level of the new price improved order to two. This way, the dynamic PI order still maintains its position in the stack, but does not have its price improvement level increased to three. Thus, such functionality prevents unnecessary inflation of price improvement levels.

A known consequence of using price improvement is that it may result in situations in which all bids or offers in the stack use price improvement, resulting in a stack arrangement that is the same as if the system does not have price improvement functionality. In some situations, traders may prefer to trade at standard pricing increments and not pay any price improvement increments to retain a certain position in a trading stack.

In other situations, traders may wish to participate in a trading system that uses a new feature such as price improvement, but would like to have an option to opt out of participating in the trading rules and/or scheme governing the new feature.

Therefore it is an object of the invention to provide systems and methods to allow certain traders to trade at the predetermined pricing increments, but also do not have their orders automatically passed over by price improved orders in a trading system that uses price improvement functionality.

It is also an object of the invention to provide systems and methods that allow traders to opt out of being subjected to the trading rules and/or scheme governing a particular feature, yet still permit traders to engage in competitive trading.

SUMMARY OF THE INVENTION

These and other objects of the invention are accomplished in accordance with the principles of the invention by providing an electronic trading system that permits traders to submit price improvement orders that are traded at predetermined pricing increments and that maintain a position in a trading stack based on the size of other orders already existing in the stack at the time the order is submitted. This type of price improvement relates to neutral price improvement according to the invention.

Generally, neutral price improvement represents an option that permits a trader to opt out of or be exempt from being subjected to the trading rules and/or scheme governing a particular feature (e.g., price improvement), yet still permit traders to engage in competitive trading. For example, assume that a trader is participating in a trading system implementing the price improvement feature. In such a system, the price improvement rules may be applied generally to all orders in the system, except for orders submitted with the neutral price improvement option. That is, the neutral price improvement order operates according to non price improvement rules, but operates within a trading system that applies price improvement rules to other orders.

Neutral price improvement guarantees an order's position, with respect to size, in a trading stack regardless of the subsequent submission of any other order (e.g., price improved orders). Moreover, neutral price improvement enables a trader to also submit a neutral price improvement style order (or neutral order) that trades at the predetermined pricing increment, not at one of the price improvement levels used in connection with other price improvement orders.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 1-6 show examples of trading operations using neutral PI orders in accordance with the principles of the present invention;

FIG. 7 illustrates one embodiment of a graphical interface for submitting trading commands in accordance with the principles of the present invention;

DETAILED DESCRIPTION OF THE INVENTION

Figure 8:
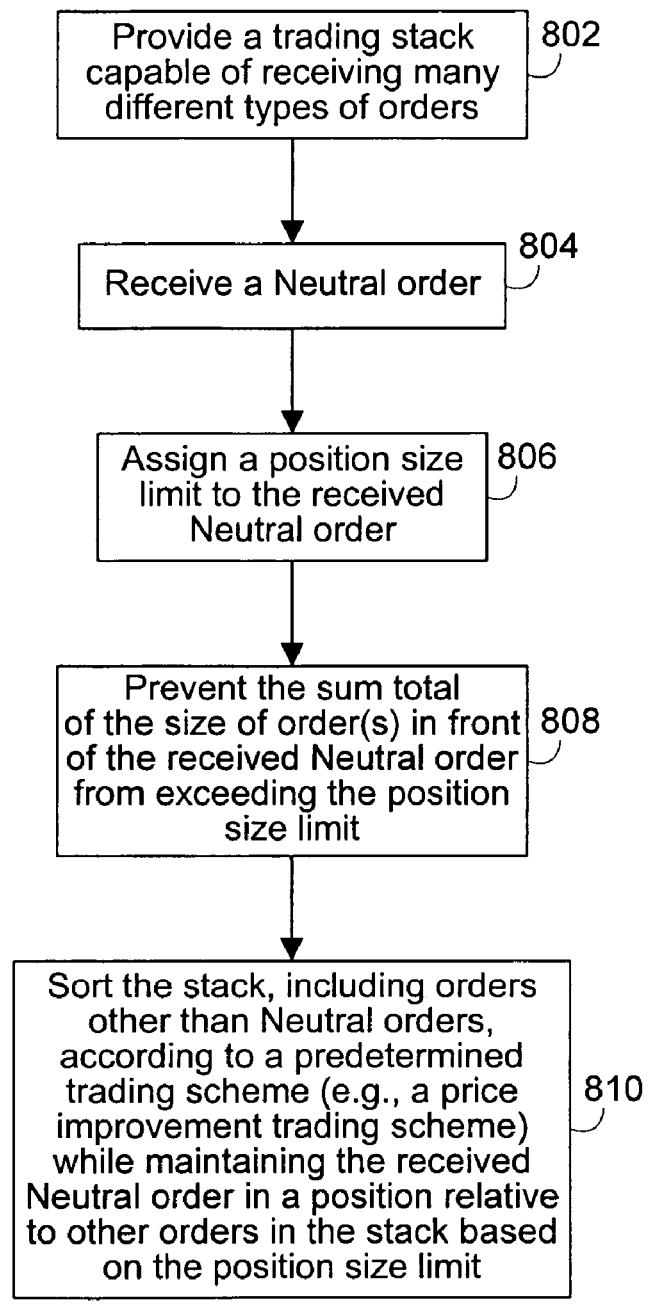
FIG. 8 shows an illustrative flowchart of a process for handling neutral orders in accordance with the present invention.

An electronic trading system and method is provided that permits traders to submit price improvement orders that are traded at predetermined pricing increments and that maintain a position in a trading stack based on the size of other orders already existing in the stack at the time the order is submitted.

A predetermined pricing increment is typically defined by the instrument being traded. For example, the two-year United States government bond may trade at predetermined pricing increments of ¼ of 1/32 of a nominal value. If a stock is being traded, the stock may be traded at predetermined pricing increments of one penny. As another example, certain Exchange Traded US Stock Options may trade at a pre-determined standard price increment of five cents in price. In certain trading systems, a user may submit a traditional order, which has a price corresponding to a predetermined pricing increment. Traditional orders are sometimes referred to herein as PI(0) (orders at standard price increments without price improvement).

In trading systems, such as those disclosed in the '779 and '009 applications, traders may submit orders that improve on a price for a particular item at an amount less than a predetermined pricing increment. For clarity and ease of presentation, such orders are referred to herein as price improvement orders. For example, in such trading systems as detailed in the '779 and '009 applications, price improvement orders include dynamic price improvement orders (e.g., PI(dynamic)) and orders having a specific price improvement level such as one (e.g., PI(1)), two (e.g., PI(2)), or three (e.g., PI(3)). It is understood that the price improvement levels of price improving orders can also be set to ever decreasing economic values, to allow more price improvement levels to be utilized in a trading system.

In other trading systems, such as certain Exchange Traded US Stock Option trading systems, that use price improvement, such use of price improvement (i.e., price improvement levels) may be implemented only in certain trading scenarios (e.g., trading or price improvement states). Such trading systems may be referred to as an auction style of trading that uses price improvement. Such trading systems may permit traders to price improve on "active" orders, thereby enabling traders to submit price improved orders (using price improvement levels) to improve the price of the "active" order. For example, assume that a trader submits an order to sell a predetermined number of options at a particular price. Further assume that a contra-trader is prepared to buy those options at that particular price. Before the order is executed, other traders may submit orders to buy the options at an improved price (i.e., a price that price improves on the predetermined price using a price improvement increment). If such a price improved order is submitted, then the price improving trader takes precedence over the contra-trader. In yet other trading systems, price improvement may be used in a price and time priority style of trading.

Trading systems that are in accordance with the principles of the present invention permit traders to submit traditional orders, price improvement orders (PI), and neutral price improvement orders. Neutral price improvement orders may sometimes be referred to herein as PI(neutral), neutral PI order, or neutral order. A neutral PI order is an order that trades at the predetermined pricing interval and maintains a position in the trading stack based on the total size of orders existing in the stack prior to submission of the particular neutral PI order. An advantage of neutral PI orders is that they provide traders with yet another price improvement trading option. Yet, this particular option permits orders to be traded at non-price improved increments, while at the same time are not automatically trumped (e.g., overtaken or bettered) by necessarily all subsequently submitted price improvement orders, (whereas a traditional order would be automatically trumped and move down the pricing stack to allow the price improving order to improve its position).

Neutral PI orders may be handled by a trading system as follows. Upon receipt of a neutral PI order, the trading system may assign a timestamp to the order. This timestamp may be similar to the timestamps associated with other types of orders such as traditional and price improving orders. The trading system may place the neutral PI order behind all orders already existing in the trading stack. If the neutral PI order is the only order in the stack, then the neutral PI order is placed at the front of the stack.

In accordance with an embodiment of the invention, the neutral PI order is not assigned a price improvement level even though neutral PI may be facilitated as a "price improvement option" on the system. As will be explained in more detail below, certain orders may be switched from being in front (or above) of the neutral PI order to be placed behind (or below) the neutral PI order.

When the neutral PI order is placed in the stack (at a certain regular predetermined pricing interval), it is assigned a position size limit. This position size limit is calculated by adding up the size of each order in front of the neutral PI order on entry of said PI neutral order into the trading stack. This position size limit is used by the electronic trading system to prevent the combined size of all orders in front of the neutral PI order from exceeding the noted position size limit of that particular neutral PI order, regardless of orders submitted subsequently thereafter, for the life of the neutral PI order, or some predetermined time, or such time as may be ended by a predetermined event. Thus, the position of a neutral PI order within the stack is determined as a function of the combined size of the orders in front of the neutral PI order, at its point of entry in the stack. That is, no matter how many subsequent price improving orders are submitted that would price improve on the neutral PI order, the combined size of orders in front of the neutral PI order may not exceed the position size limit.

In some embodiments, the position size limit may be a fraction or a multiple of the size existing in front of the PI neutral order on its entry to the stack. Persons skilled in the art will appreciate that by preventing the combined size in front of the neutral PI order from exceeding the position size limit of that neutral PI order, the neutral PI order maintains a position in the stack based on its position size limit and the size of the orders in front of it.

Although the combined size of orders in front of a particular neutral PI order may not exceed the neutral PI order's position size limit, this position size limit may in time become smaller than the original position size limit associated with the neutral PI order. That is, the position size limit associated with a particular neutral PI order can be decreased. Such a decrease may occur when an order in front of the neutral PI order is matched with a contra order and/or in some embodiments when an order in front of the PI neutral order is cancelled.

In some embodiments the position size limit may be increased due to the end of a time period, or on a predetermined event affecting the trading system such as an economic figure or other external market moving event. The use of neutral PI orders may be governed by the trading system by increasing the position size limit to dilute or remove the neutral PI functionality by allowing other PI order size to then be promoted in front of PI Neutral.

In one embodiment, the position size limit may be decreased when an order (e.g., an older timestamp order or a newer timestamp order with a price improvement level of greater than zero) is cancelled or traded. In another embodiment, in the event of a cancellation of an order originally in front of the neutral PI order, the position size limit may decrease if there is no size from another order (e.g., dynamic PI order) behind the neutral PI order that can occupy the cancelled order's position in front of the neutral PI order.

The following explains by way of example how the trading system maintains the position of a neutral PI order in the trading stack with respect to size. In one example, if a neutral PI order is the first order in the stack, the trading system assigns a position size limit of zero to the order. Thus, no orders are permitted to jump in front of the neutral PI order because this would exceed the position size limit of the order. It is noted, however, that in some embodiments that a neutral PI order may still be trumped by other orders retaining special privileges such as a last trader privilege. A last trader privilege may permit a trader who was the last trader to have an order traded in the system to have the opportunity to jump in front of a trader submitting such a neutral PI order.

In another example, if the neutral PI order is preceded by at least one other order, the trading system assigns a position size limit equal to the combined size of each order in front of the neutral PI order. Regardless of subsequently submitted price improving orders, the combined size of the orders in front of the neutral PI order may not exceed its position size limit.

An advantage of this invention is that although the combined size of order(s) existing in front of the neutral PI order may not be permitted to exceed the position size limit, price improving orders (e.g., PI(dynamic) or PI(2)) submitted subsequent to the neutral PI order may be switched in whole or in part with orders in front of the neutral PI order that have a lower PI level. This permits price improvement to commence within the confines of the position size limit set by a particular neutral PI order.

A portion of or all of a subsequently entered "superior" price improving order can improve on and displace a portion of or all of a pre-existing order residing in front of the neutral PI order in a trading stack. This "superior" price improving order may displace up to the full size of one or more "lesser PI level" orders that are in front of the neutral PI order, while still maintaining the position size limit of the neutral PI order being jumped. In certain trading situations, such a displacement may result in a split of the "superior" order into two or more sizes. For example, a "superior" PI order may be split in two, with one portion displacing an order in front of the neutral PI order and the other portion taking a position behind the neutral PI order (the position size limit of the PI neutral order having not been increased). Regardless of how a "superior" order is split, both portions may retain the same price improvement level or the order may have its price improvement levels split to show different price improvement levels in each position. Other trading situations may result in a split of "lesser PI" orders, where only a portion of that order is displaced behind a neutral PI order by a "superior" order.

If the "superior" price improving order is a dynamic order, the price improvement level may increase to improve on the price improvement level of any "lesser PI" order in the stack. For example, if the order being displaced has a price improvement level of one, the dynamic order may adjust its price improvement level to two to improve on the (older timestamp) order in front of the neutral PI order.

In the event an improving order (e.g., dynamic PI order) cannot get in front of a neutral PI order, the improving order may use a price improvement level to obtain the best position possible behind the neutral PI order. For example, according to one embodiment of dynamic PI usage if the only order in front of the neutral PI order is a PI(dynamic) order, a subsequently entered PI(dynamic) order may not increase its price improvement level to match or exceed that of the first PI(dynamic) order. However, in the alternative, it may adjust its price improvement level to only improve on orders behind the neutral PI order.

FIGS. 1-6 show examples of trading operations using neutral PI orders. Each example shows the time sequence in which orders are submitted to the trading system. Each example also shows how orders are sorted in the stack in an embodiment in accordance with the principles of the present invention. The examples also show the price improvement level of orders in the stack, if applicable. Referring now to FIG. 1, this example shows that the trading system receives orders A, B, and C before sorting according to the invention. Order A is a traditional order (e.g., PI(0)) of size 5 m, where "m" may represent "million" and a size of "5 m" may represent 5,000,000. Order B is neutral PI order (e.g., PI(neutral)) of size 4 m. After order B is submitted, the trading system may assign a position size limit of 5 m to order B. Order C is a price improving order (e.g., PI(dynamic)) of size 3 m.

After order C is entered, the trading system may sort the stack according to the principles of the invention. As shown, the full size (e.g., 3 m) of order C displaces 3 m of order A because order C price improves on order A. In this particular example, the price improvement level of order C increases to PI level one to improve on order A. Order A splits, causing 2 m of order A to remain in front of the neutral PI order (i.e., order B) and the remainder of 3 m to be placed behind order B. Thus, it is seen that order B maintains its position in the stack with respect to size. That is, the combined size of the orders in front of order B does not exceed 5 m.

Referring now to FIG. 2, this example shows that a traditional order (e.g., order A) of size 5 m, a neutral PI order (e.g., order B) of size 4 m, and a dynamic price improving order (e.g., order C) of size 40 m are received by the trading system. Once received, the trading system sorts the orders in accordance with the principles of the invention. As shown, the price improving order improves on and displaces the traditional order by increasing its price improvement level to one. Only 5 m of the price improving order is placed is front of the neutral PI order because the position size limit of the neutral order is 5 m. Thus, the price improving order is split, with 5 m in front of the neutral PI order and 35 m behind the neutral PI order. Note that 35 m of the price improving order takes precedence over the traditional order because it is price improved over the traditional order.

Referring now to FIG. 3, this example shows that a dynamic price improving order of size 5 m, neutral order of size 4 m, and a dynamic price improving order of size 40 m are submitted to the trading system. Once received, orders A, B, and C maintain their position because order C cannot improve on order A. Note, that the price improvement level of order A increases to one, while the price improvement level of order C remains at zero because order C did not achieve a better stack position.

FIG. 4 shows an example in which a neutral PI order is submitted first followed by a price improving order (e.g., a dynamic order). The trading system prevents the price improving order from jumping in front of the neutral PI order because the position size limit of the neutral PI order is zero. The price improvement level of the price improving order is kept at zero.

Cancellation of order(s) in front of a neutral PI order may result in a rearrangement of orders in the stack. For example, if an order having a timestamp older than the timestamp of a neutral PI order is cancelled, the stack may be sorted according to the price improvement levels and timestamps of all orders in the stack. Thus, when an order having an earlier timestamp than that of a neutral order is cancelled, this does not automatically reduce the position size limit. The price improvement levels and timestamps of the orders may be taken into account before effecting a change in the position size limit. FIG. 5 shows an example of this particular situation. FIG. 5 shows that a price improving order having a price level of one and size of 5 m is submitted first, followed by a neutral PI order of size 4 m and dynamic price improving order of size 40 m. These orders are sorted as shown. The price improvement level of the dynamic price improving order increases to a PI level of two to improve on and displace the level one price improvement order.

When order A is cancelled, the trading system may re-sort the stack according to price improvement levels and timestamps. In one embodiment, with order A removed, 5 m of order C may remain in front of order B because order C has a superior PI level (e.g., PI(2)), even though order A has an older timestamp than order B. As shown, the price improvement level of order C may drop down to level one because a price level of two is not needed to maintain its position in the stack when order A is cancelled.

As another example, if an order having a timestamp younger than the timestamp of the neutral PI order is cancelled (it may be in front of a PI neutral order due to a superior PI level displacing a lower PI level order), the stack may be sorted such that the order(s) that were previously in front of the neutral PI order are restored to their previous position to the maximum size possible, respective to the position size limit of each neutral PI order. FIG. 6 illustrates such an example. FIG. 6 is similar to FIG. 5 except that order C is cancelled, as opposed to order A. With the cancellation of order C, order A is restored to its original position in the stack.

When an order in front of the neutral PI order is executed or matched with a contra order, the position size limit associated with that neutral PI order may be decreased by the size of the execution or match. For example, if the position size limit of a particular neutral PI order is 5 m, an execution or match of 3 m in front of this neutral PI order may reduce the position size limit of the neutral PI order to 2 m. Consider, for example, the trading scenario shown in FIG. 1. If the dynamic order C is executed or matched entirely, it would be removed from the stack. The 3 m of the traditional order behind the neutral PI order may not be allowed to entirely move back in front of the neutral order because the position size limit of order B has been reduced to 2 m. Thus, only the 2 m of order A remains in front of order B. However, if a new dynamic PI order of size 5 m were to be submitted, 2 m of this new dynamic PI order may displace the 2 m of the order A.

In one embodiment, either the cancellation or matching of an order may result in a decrease in the position size limit. Considering, for example, the trading scenario shown in FIG. 1. If the traditional order A is matched or cancelled for 2 m, the position size limit may be reduced to 3 m (from 5 m) because 2 m of the traditional order in front of order B is removed. In another embodiment, the position size limit of a particular neutral PI order may be decreased only when (a) an order is cancelled and (b) there is no order (e.g., dynamic order) behind the neutral PI order that can take the place of the cancelled order. Consider, for example, the trading scenario in FIG. 3. If order A is cancelled, the position size limit of neutral PI order B is maintained at 5 m because 5 m of dynamic order C can occupy the position vacated by the 5 m of order A that was cancelled. However, if order C was a traditional order, for example, the position size limit of order B may decrease to zero when order A is cancelled because the traditional order C cannot jump in front of order B.

Neutral PI orders may not be traded/executed at improved prices. As a result, traders that use neutral PI orders may not have to pay fees (e.g., fees paid to contra trader and/or to the electronic trading system host) or benefit from trading against other contra orders executed at a price improved price. Rather, traders that use neutral PI may pay a predetermined fee, which may be determined irrespective of the price at which an order is traded.

Figure 7:
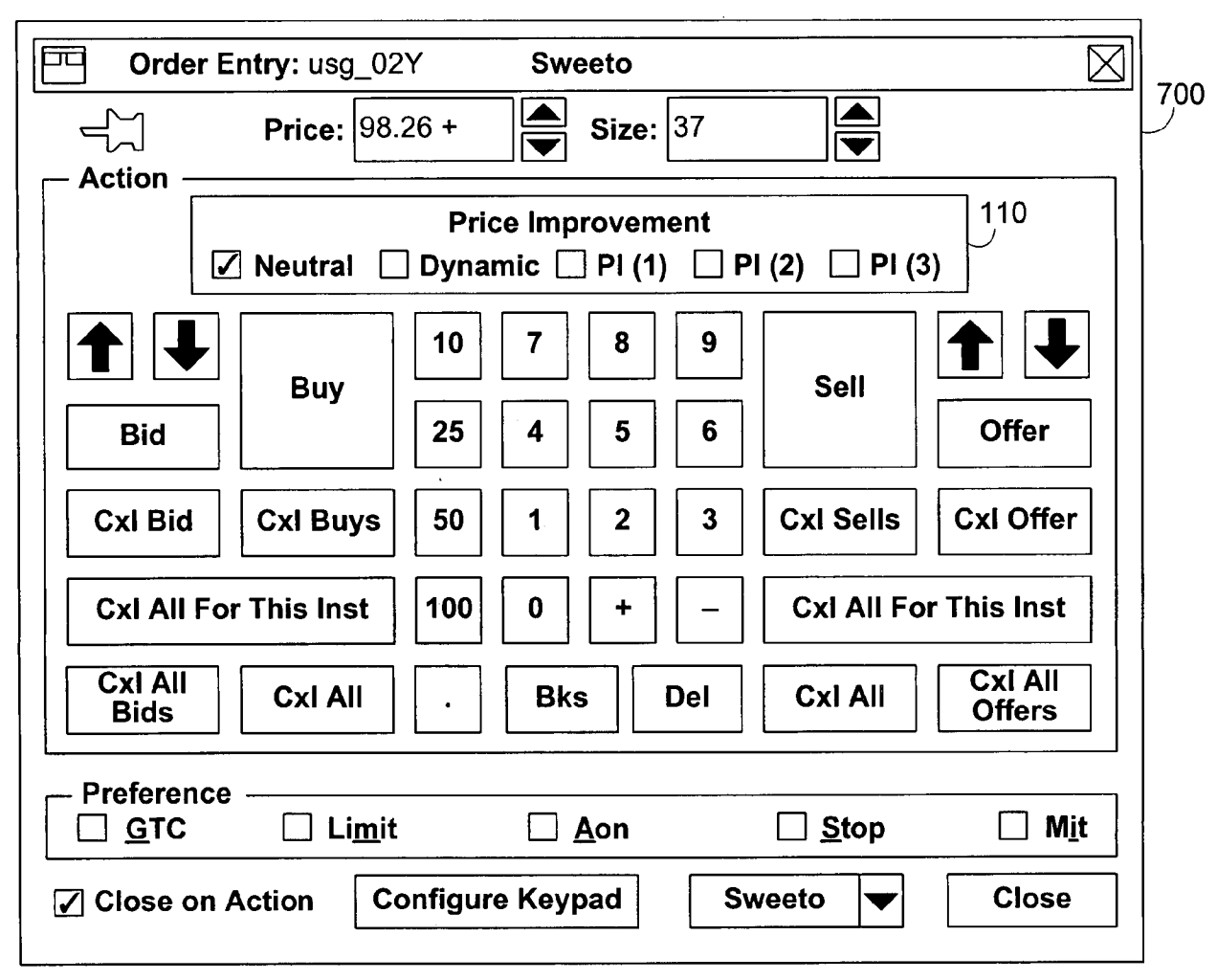
Figure 11:
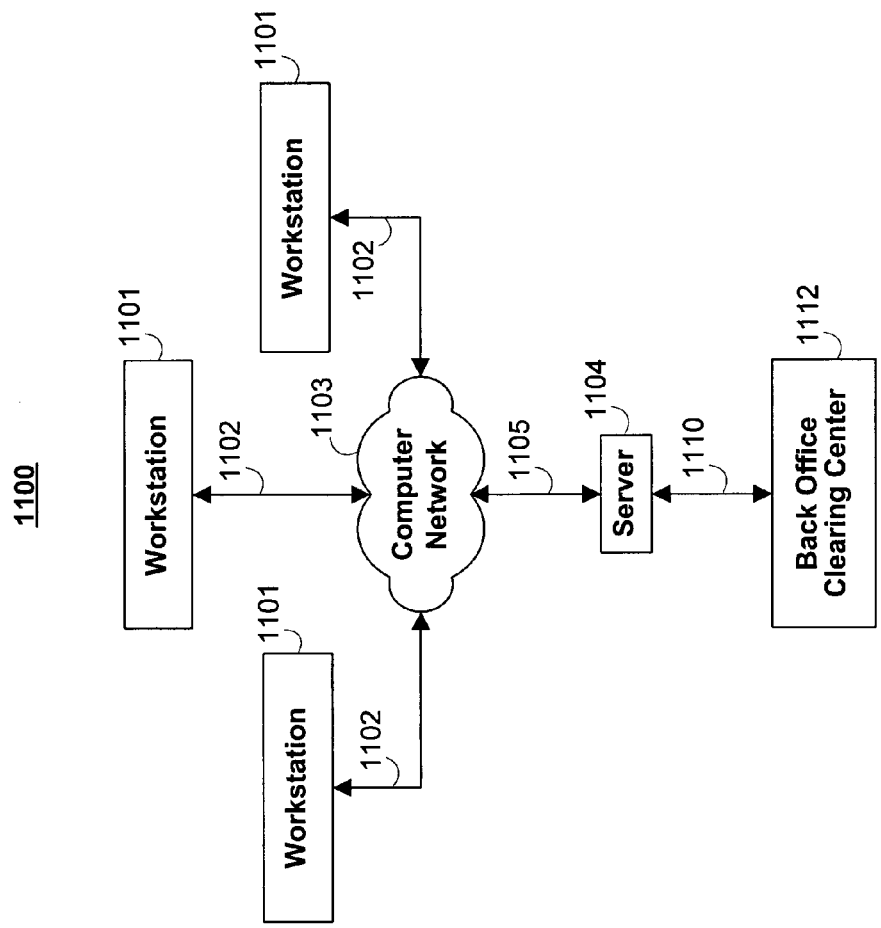
FIG. 11 is a block diagram of an exemplary system that may be used to implement the processes and functions according to the invention in accordance with the principles of the present invention.

FIG. 7 illustrates one embodiment of a graphical interface 700 for submitting trading commands using, for example, a workstation as shown in FIG. 11. Interface 700 includes price improvement trading box 710, which has first, second, and third price improvement level options, a dynamic price improvement option, and a neutral price improvement option that can be selected by the trader. If a trader wishes to trade using neutral price improvement, the neutral price improvement option in box 710 can be selected. Selection of this box can change the nature of the application pertaining specifically to the instrument being traded such as, for example, not displaying indicia that indicates existence of price improvement used on a standard price level, and preventing a trader from receiving a financial benefit of trading with other price improved orders. Traders may also select PI neutral to be a default application for all instruments in any particular market sector, or all instruments in general.

Persons skilled in the art will appreciate that the above description with respect to FIG. 7 is not intended to be an exhaustive description of various features that can be included with dialog window 700. It does, however, discuss features pertinent to describing the present invention. United States patent application publication No. 2002-0029180 published Mar. 7, 2002, which is hereby incorporated by reference in its entirety, provides a substantial description of dialog window 700.

Price improvement trading can be implemented with a variety of trading schemes such as, for example, Direct Dealing (hereinafter "DD"—sometimes referred to as "Request for Quote" style trading) and traditional market style trading. In DD style trading, there are requesters and responders. The requesters can enter a request for prices on a particular item or instrument. A responder may submit prices in response to that request. The requester may then choose to trade with one of the responders.

A traditional market style of trading may be one that enables traders to submit bids and offers for a particular item. Traders can hit a bid or lift an offer to commence a trade. Other traditional market styles of trading may also enable traders to submit bid and offer orders for automatic matching where possible, such as in a futures market. Further traditional styles of market trading may be an auction style where a bid or an offer for an amount of an instrument is introduced to a marketplace for participants to offer or bid in an auction process, thereby determining a trade price for that amount of the instrument.

FIG. 8 shows a flow chart of illustrative steps that may be taken by a system using neutral price improvement in accordance with the present invention. Beginning at step 802, a trading stack capable of receiving many different types of orders is provided. The various types of orders may include, but are not limited to, traditional orders, neutral orders, RFQ orders, direct dealing orders, and price improvement orders such as price level price improvement orders, dynamic price improvement orders.

After a neutral order is received at step 804, a position size limit is assigned to the received neutral order, as indicated by step 806. As discussed above, the position size limit may be used to limit the total size of orders in front of the neutral order, thereby allowing price improvement rules to govern the operation of orders in the stack, yet still enable the neutral order to remain competitive. The received neutral order may remain competitive by preventing the total size of order(s) in front of the received neutral order from exceeding the position size limit, as indicated in step 808. At step 810, the orders in the stack may be sorted according to a predetermined trading scheme (e.g., a price improvement trading scheme) while maintaining the received neutral order in a position relative to other orders in the stack based on the position size limit. Several examples relating to step 810 are discussed above in connection with FIGS. 1-6.

Figure 9A:
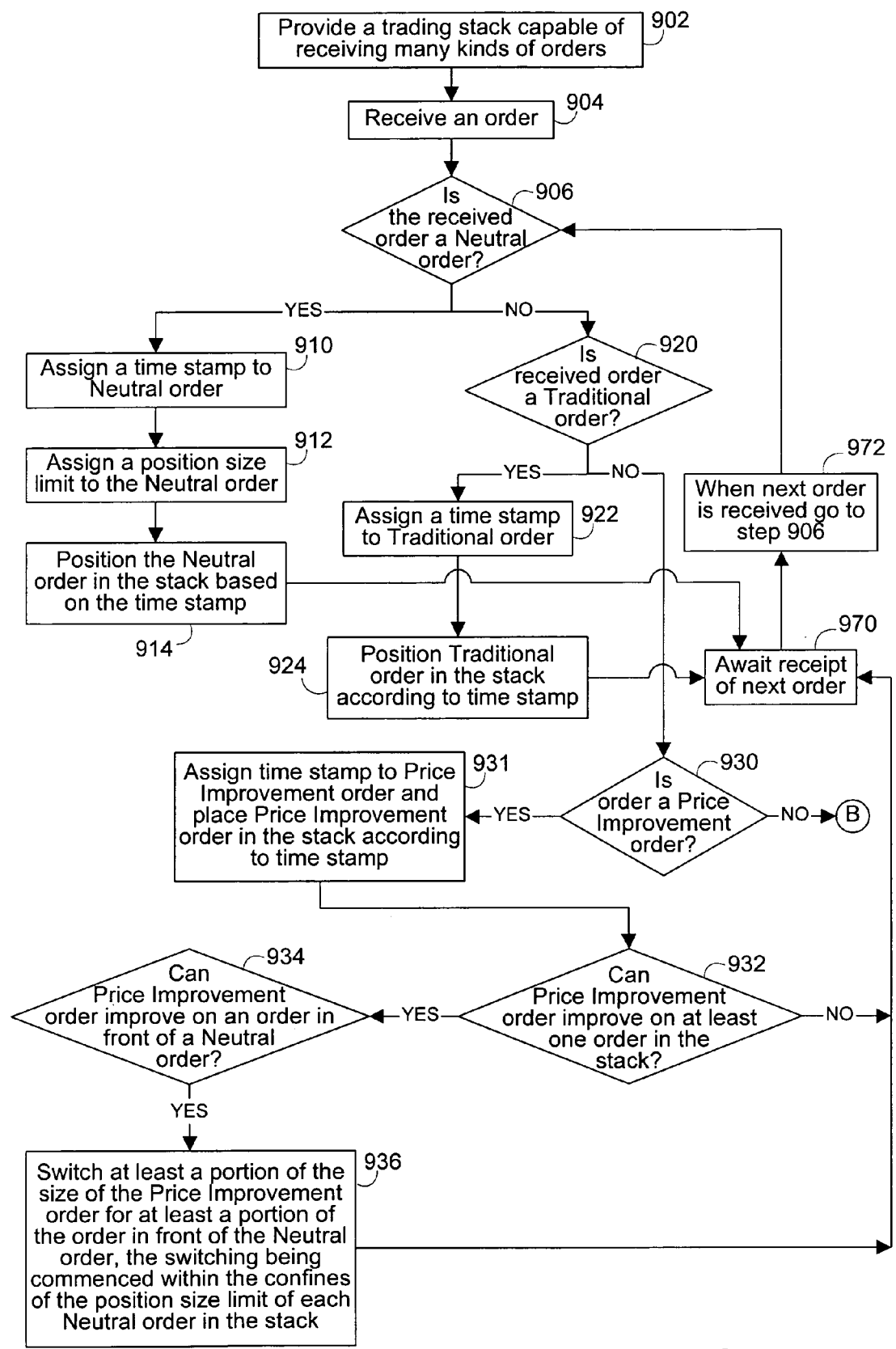
FIG. 9 shows an alternative flowchart of a process for handling orders received by an electronic trading system in accordance with the principles of the present invention.
Figure 9B:
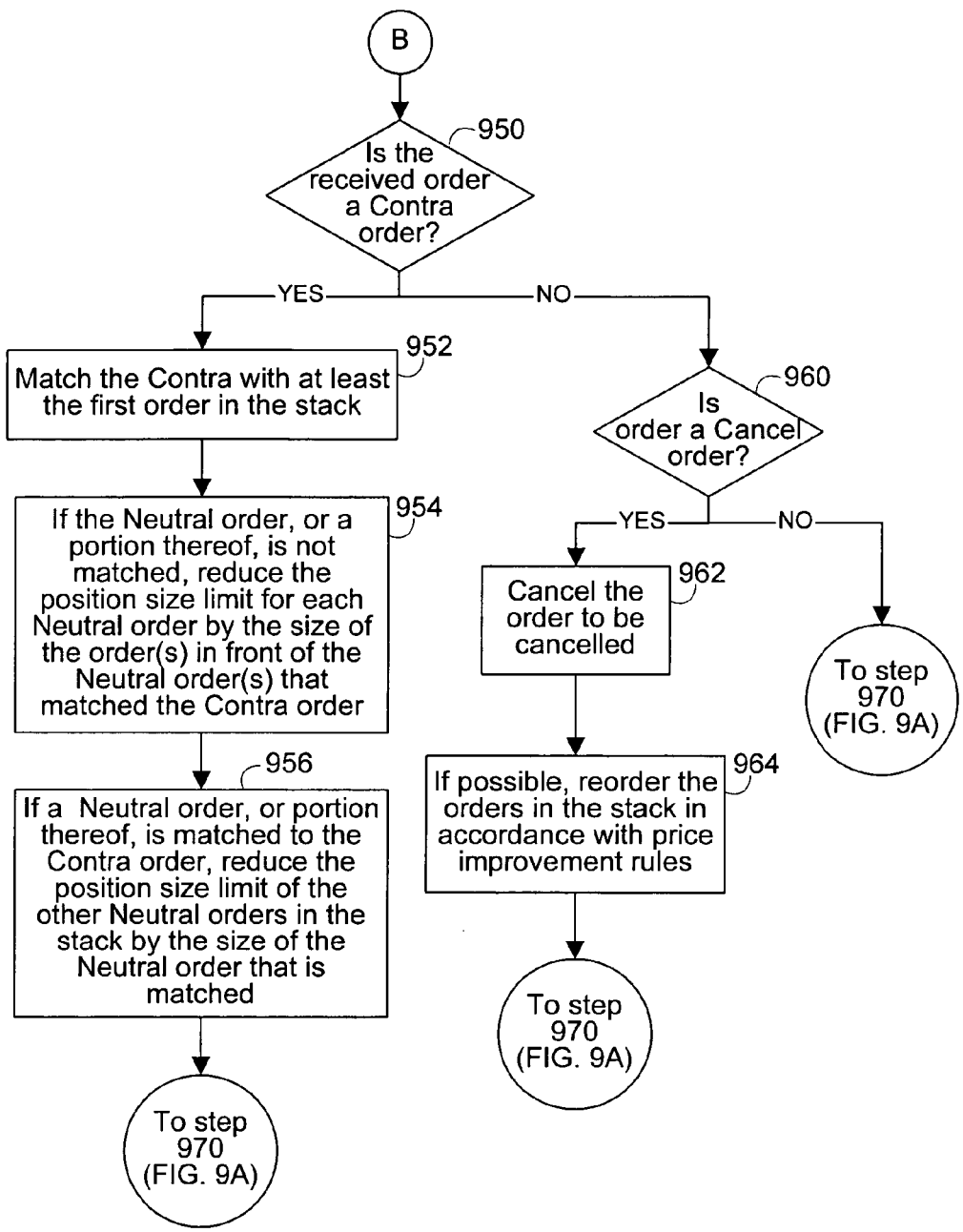

FIGS. 9A and 9B show a flow chart illustrating steps that may be taken by a system using neutral price improvement in accordance with the present invention. Starting at step 902, a trading stack capable of receiving many different types of orders is provided. At step 904, an order is received and a determination is made at step 906 as to whether the received order is a neutral order. If the received order is a neutral order, the process proceeds to step 910, which assigns a timestamp to the neutral order. A position size limit is assigned to the neutral order at step 912. At step 914, the neutral order is positioned, at least initially, in the stack based on the timestamp. For example, if three orders exist in the stack at the time the neutral order is received, the neutral order may be placed in the fourth position in the stack. After the neutral order is positioned in the stack, the process proceeds to step 970, where the system awaits receipt of the next order. When an order is received, at step 972, the process loops back to step 906.

If at step 906, it is determined that the received order is not a neutral order, the process proceeds to step 920, which determines if the received order is a traditional order. If the received order is a traditional order, a timestamp is assigned to the traditional order (at step 922) and it is positioned in the trading stack according to its timestamp (at step 924). After the traditional order is placed in the stack, the process proceeds to step 970. If it is determined that the received order is not a traditional order, the process proceeds to step 930, which determines if the received order is a price improvement order.

If the received order is a price improvement order, then at step 931, a time stamp is assigned to the order and it is placed in the stack according to that timestamp. Then at step 932, a determination is made if the price improvement order can price improve on at least one order in the stack in accordance with the principles of the present invention. If price improvement is possible, a determination is made to see if the price improvement order can price improve on an order in front of a neutral order, at step 934. If price improvement is not possible at step 932, the process proceeds to step 970.

If the determination at step 934 indicates that the price improvement order can price improve on an order in front of the neutral order, then at step 936, the trading system may switch at least a portion of the size of the price improvement order for at least a portion of the order in front of the neutral order, with any switching being commenced within the confines of the position size limit of each neutral order in the stack. It will be understood that the price improvement order cannot substitute any portion of a neutral order. The examples described above in connection with FIGS. 1-3 relate to step 936. After switching of orders is complete at step 936, the process proceeds to step 970. If the determination at step 934 is NO, the process proceeds to step 970.

At step 950, a determination is made if the received order is a contra order. A contra order may be an order that can be matched or traded with an order in the stack. For example, if the orders in the stack are buy orders, a contra order would be a sell order. If the order is a contra order, the contra order is matched with at least the first order in the stack, as shown in step 952. It is understood that the contra order may match a portion of an order in the stack, in which case the portion may just be a portion of the order because the contra order is smaller than the size of the order in the stack or because the contra order fully matches the size of the order in a particular location in the stack, with a remaining portion of that order existing elsewhere in the stack. In other cases, it is understood that the contra order may be matched with the entire size of an order and not just a portion thereof. It is also understood that a portion of the contra order may be matched, at least initially, if orders existing in the stack are not large enough to fully fill the contra order.

After the contra order, or portion thereof, is matched and if a neutral order, or portion thereof, is not matched, the position size limit for each neutral order may be reduced by the size of the order(s) matched in front of the neutral order(s). This step is shown in step 954. If a neutral order, or portion thereof, is matched with the contra order, the position size limit of the other neutral orders in the stack is reduced by the portion of the size of the neutral order that is matched. When the position size limit or limits have been properly reduced, the process proceeds to step 970.

If at step 950 it is determined that the received order is not a contra order, the process proceeds to step 960, which determines if the received order is a cancel order. If so, the order to be cancelled in the stack is cancelled at step 962. An example of this is discussed above in connection with FIG. 6. If possible, various orders may be rearranged in accordance with predetermined trading rules at step 964. An example of this is discussed in connection with FIG. 5. After step 964 or if the received order is not a cancel order, the process proceeds to step 970.

It is understood that the steps shown in FIGS. 9A and 9B are merely illustrative and that additional steps may be added or one or more steps may be omitted. For example, additional steps may be added to show how the system handles an erroneously entered order. As another example, additional steps may be added to indicate how the price improvement level of various price improvement orders is increased or decreased depending on market conditions.

Figure 10:
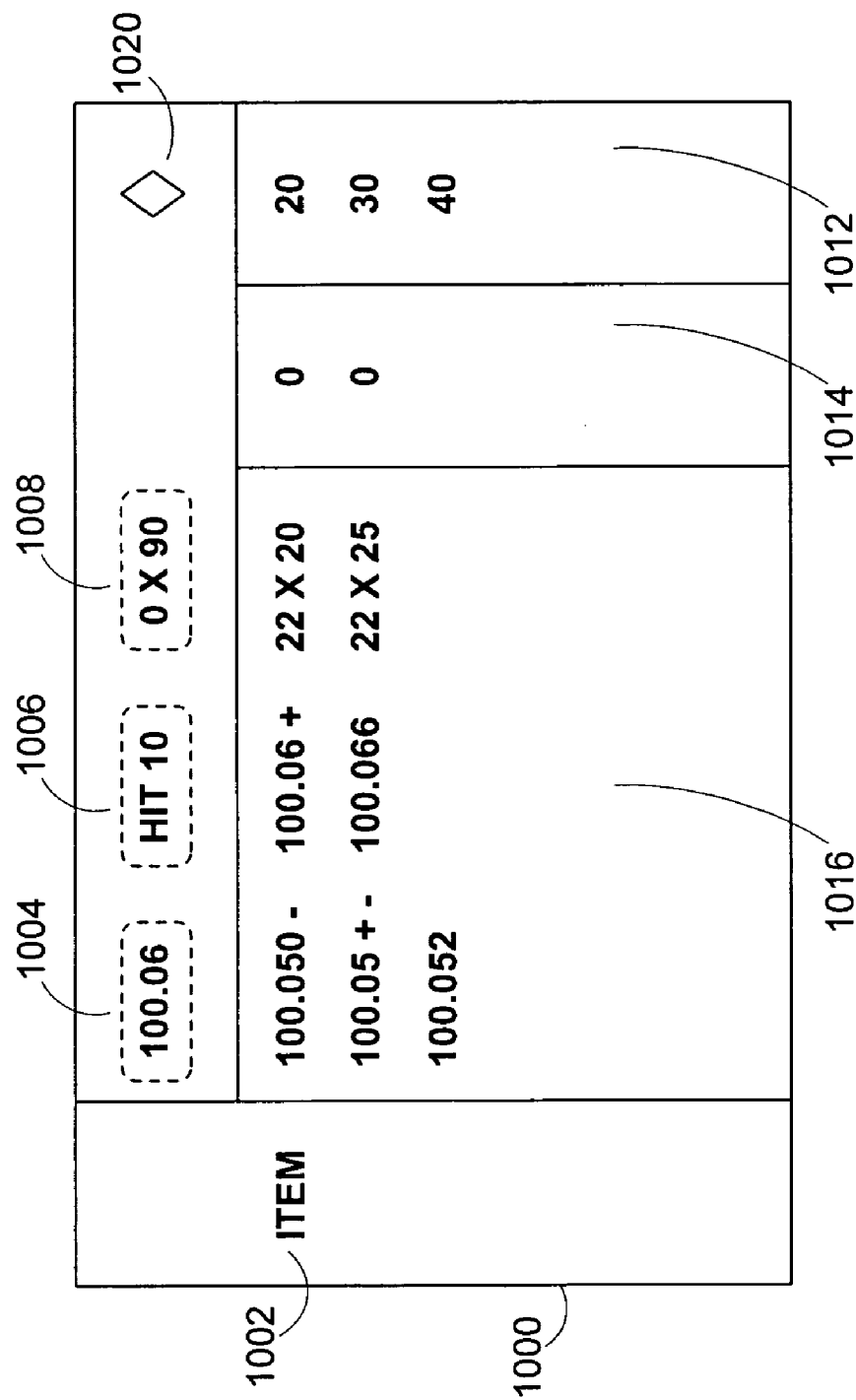
FIG. 10 shows an illustration of a market cell that may be generated according to the principles of the present invention.

With reference now to FIG. 10, neutral price improvement is described in context of market cell 1000 for a selected item. FIG. 10 is described primarily in the context of a trade state in which traders are actively buying and selling an item by submitting buy and sell orders. Although FIG. 10 is being described in the context of a trade state, it is understood that neutral price improvement of the present invention can be used in conjunction with a bid/offer state in which traders submit bids and offers for an item, any automatic matching thereof, and any auction style matching thereof.

FIG. 10 illustrates a market cell 1000 where users are participating in a market in which selected item 1002 is being traded. Selected item 1002 may be any suitable type of commodity such as, for example, securities, bonds, coupons, etc. Price 1004 indicates the current selling and/or buying price of selected item 1002. Trade status 1006 provides an indication of what type of trading activity is taking place with respect to selected item 1002. Item indicator 1008 provides an indication of the quantity of selected item 1002 available in the market. If, for example, sellers are operating in the active side of the market, the item indicator 1008 informs market participants the total number of items 1002 that are available for sale in the market. Seller stack 1012 informs market participants the quantity of selected items 1002 a particular seller is prepared to sell. Likewise, buyer stack 1014 informs market participants the quantity of selected items 1002 a particular buyer is prepared to buy. Market depth indicator 1016 provides information regarding the depth of the market (i.e., the price and quantity of items available in the market, at prices different than the standard predetermined increment price).

When a trader submits a price improving order, a price improvement indicator 1020 may be displayed to indicate that price improvement is taking place. Price improvement indicator 1020 may be any suitable distinguishing character such as, for example, a diamond, a carrot, text (e.g., PI) or other distinguishing mark. Price improvement indicator 1020 may be displayed if a neutral PI order is the only order in the stack, so subsequent price improving traders are made aware that a neutral PI order or a price improving order is already in the stack. It is understood that in some embodiments price improvement indicator 1020 may not be displayed on account of a neutral PI order, and may only be displayed if at least one other price improving order (e.g., PI(dynamic)) already exists in the stack. In one embodiment, if a neutral PI order is matched with a contra order, then in certain situations the system may compensate the contra trader in accordance with price improving rules, but the neutral trader may still only trade at the standard price increment.

It is understood that neutral PI orders may be applied to different types of orders, such as limit, stop, good-till-canceled, all-or-none, market-if-touched. These different order types are known to those with skill in the art and need not be discussed with particularity.

Referring to FIG. 11, exemplary system 1100 for implementing the invention is shown. As illustrated, system 1100 may include one or more workstations 1101. Workstations 1101 may be local or remote, and are connected by one or more communications links 1102 to computer network 1103 that is linked via communications links 1105 to server 1104. Server 1104 is linked via communications link 1110 to back office clearing center 1112.

In system 1100, server 1104 may be any suitable server, processor, computer, or data processing device, or combination of the same. Server 1104 may be used to process the transactions entered into by one or more traders.

Computer network 1103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 1102 and 1105 may be any communications links suitable for communicating data between workstations 1101 and server 1104, such as network links, dial-up links, wireless links, hard-wired links, etc.

Workstations 1101 may be personal computers, laptop computers, mainframe computers, dumb terminals, data displays, Internet browsers, Personal Digital Assistants (PDAs), two-way pagers, wireless terminals, portable telephones, etc., or any combination of the same.

Back office clearing center 1112 may be any suitable equipment, such as a computer, a laptop computer, a mainframe computer, etc., or any combination of the same, for causing the proposed transaction, and other transactions such as trades with neutral PI orders, to be cleared and/or verifying that transactions are cleared. Communications link 1110 may be any communications links suitable for communicating data between server 1104 and back office clearing center 1112, such as network links, dial-up links, wireless links, hard-wired links, etc.

Figure 12:
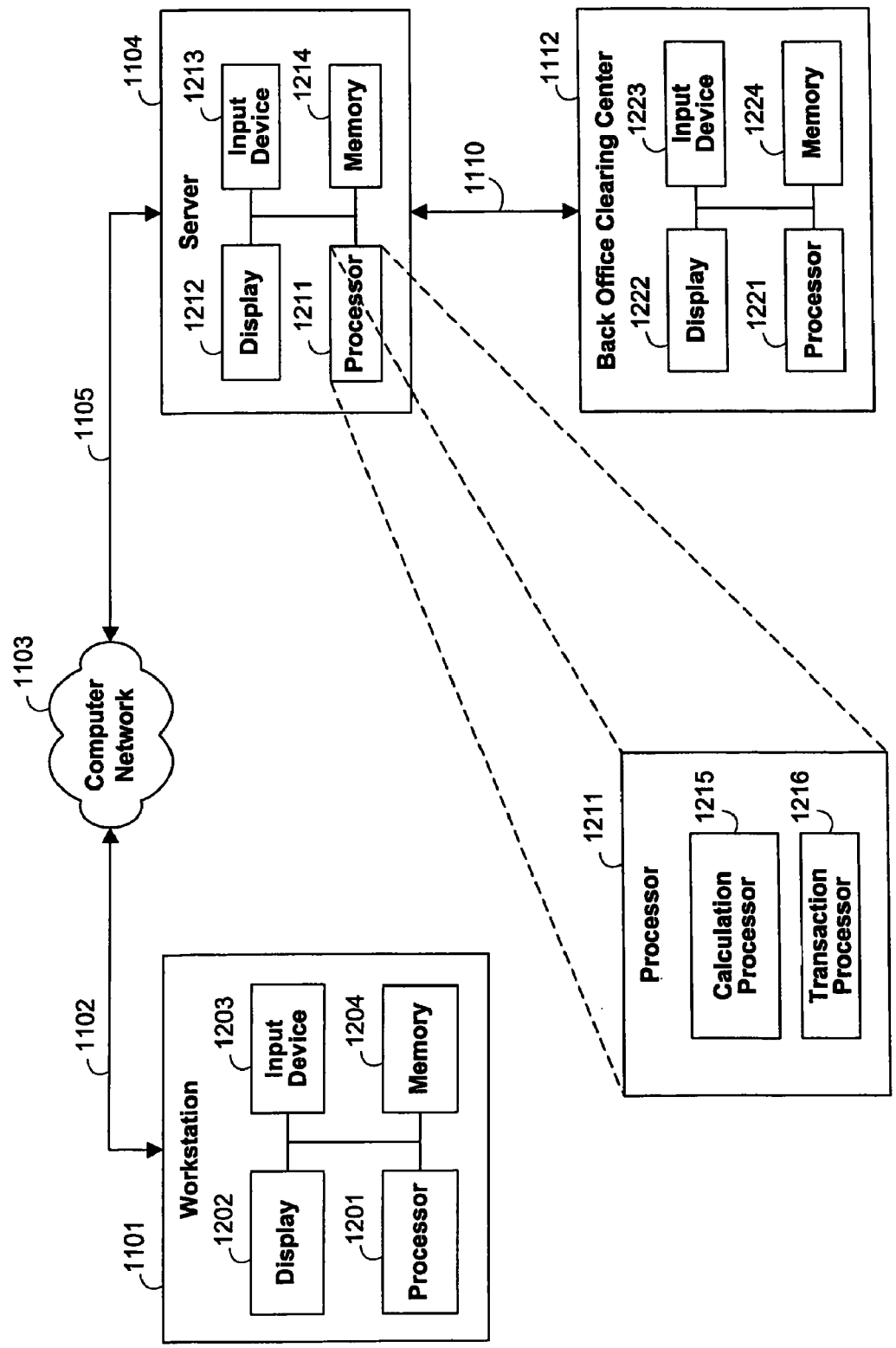
FIG. 12 is a more detailed block diagram of the system shown in FIG. 11 in accordance with the present invention.

The server, the back office clearing center, and one of the workstations, which are depicted in FIG. 11, are illustrated in more detail in FIG. 12. Referring to FIG. 12, workstation 1101 may include processor 1201, display 1202, input device 1203, and memory 1204, which may be interconnected. In a preferred embodiment, memory 1204 contains a storage device for storing a workstation program for controlling processor 1201. Processor 1201 uses the workstation program to present on display 1202 information relating to the proposed transaction to a user of workstation 1101. Furthermore, input device 1213 may be used to enter such information and to enter into the proposed transaction or execute a trade through, for example, entering a command that may be received by processor 1201 and communicated to server 1104.

Server 1104 may include processor 1211, display 1212, input device 1213, and memory 1214, which may be interconnected. In a preferred embodiment, memory 1214 contains a storage device for storing the information relating to the transactions entered into by one or more traders. The storage device further contains a server program for controlling processor 1211. Processor 1211 may use the server program to process the transaction information and commands displayed to and received from the trader. Processor 1211 may use the server program to process the proposed transaction. Processor 1211 may include calculation processor 1215 that determines, for example, the monetary quantity provided to a price improving trader that executed an order using price improvement. Processor 1211 may include transaction processor 1216 that processes the transaction entered into by the trader. Processor 1216 may, for example, match potential buyers and sellers by matching their credit risks or the bid/offer prices they have entered.

Back office clearing center 1212 may include processor 1221, display 1222, input device 1223, and memory 1224, which may be interconnected. In a preferred embodiment, memory 1224 contains a storage device for storing a clearing program for controlling processor 1221. Processor 1221 uses the clearing program to complete the transactions that are entered into by the trader. Processor 1221 uses the clearing program to further verify that the transactions and trades are completed and cleared.

What is claimed is:

1. A method comprising the steps of:
   in a computer of an electronic trading system, managing a trading stack of orders for items of a class, the trading system providing a standard price increment for prices of the orders and a price improvement protocol for managing and/or matching price-improvement orders, price-improvement orders being orders that the electronic trading system manages and/or matches at prices between the standard increment prices;
   receiving an order to trade the item designated as a neutral order, a neutral order being a price-improvement order managed in the priority stack automatically by a computer of the electronic trading system under a protocol including at least the following conditions:
       the neutral order is assigned a position size limit, being a size computed by the electronic trading system based on cumulative size of orders that meet criteria specified in trading rules of the trading system, pending on the same side of the market at the time that the neutral order is received into the priority stack at priorities higher than the priority of the neutral order as the neutral order is received; and
       the priority of the neutral order in the priority stack is maintained against the price improvement order(s) received after the neutral order that are submitted with higher priority than the neutral order, with the neutral order reaching its maximum position in the priority stack when the position size limit is exhausted, the neutral order's position size limit being decremented as orders are traded or cancelled off the stack, by the trading system automatically altering the price and/or priority of price-improvement orders based at least in part on the remaining position size limit of the neutral order.

2. The method of claim 1, wherein:
   the electronic trading system assigns the position size limit to the neutral order based on a total of the size of the order(s) on the same side of the priority stack as the neutral order and having higher priority than the neutral order existing in the stack at the time that the neutral order is received.

3. The method of claim 1, further comprising the steps of:
   reducing the position size limit for the neutral order by a traded portion of a size of orders in front of the neutral order as they are traded.

4. The method of claim 1, further comprising the step of:
   as a consequence of removing an order in front of the neutral order in the stack because the order in front is matched with a contra side order or cancelled, promoting a priority of at least a portion of a price improvement order from behind the neutral order to go in front of the neutral order, at a size corresponding to the removed order thereby to preserve the priority of the neutral order relative to the position size limit.

5. The method of claim 4, further comprising the step of:
   splitting the price improvement order to be promoted over the neutral order into at least first and second price improvement orders; and
   promoting the portion of the price improvement order corresponding to the size of the removed order over the neutral order.

6. The method of claim 1, further comprising the step of:
   reducing the neutral order's position size limit by the size, or portion thereof, of an order in front of the neutral order as a consequence of cancellation of the order in front of the neutral order.

7. The method of claim 1, wherein:
maintaining the neutral order's priority in the stack comprises reducing the position size limit in the event of a trade or cancellation of at least a portion of at least one of the received orders.

8. The method of claim 1, wherein:
maintaining the neutral order's priority in the stack further comprises not reducing the position size limit in the event of a trade or cancellation of at least a portion of at least one of the received orders.

9. The method of claim 1, further comprising the steps of:
switching at least a portion of the size of an order received after the neutral order to be switched with at least a portion of the size of an order received prior to the neutral order, the switching maintaining the position size limit.

10. A method comprising the steps of:
submitting an order to an electronic trading system, the electronic trading system having a computer that manages a priority stack of orders to trade items of a class, the trading system providing a standard price increment for prices of the orders and a price improvement protocol for managing and/or matching price-improvement orders, price-improvement orders being orders that the electronic trading system manages and/or matches at prices between the standard increment prices;
by trader's computer, submitting a neutral order to the electronic trading system, a neutral order being a price-improvement order managed in the priority stack automatically by a computer of the electronic trading system under a protocol including at least the following conditions:
the received neutral order is assigned a position size limit by the electronic trading system that is equal to the total size of orders on the same side of the priority stack as the neutral order and having higher priority than the neutral order as the neutral order is received existing in a priority stack at the time the neutral order is submitted; and
the priority of the neutral order relative to price-improvement orders in the priority stack is maintained relative to price-improvement orders, including price-improvement orders submitted into the electronic trading system after the neutral order with higher priority than the neutral order, with the neutral order reaching its maximum position in the priority stack when the position size limit is exhausted, the neutral order's position size limit being decremented as orders are traded or cancelled off the trading stack, by the trading system automatically altering the price and/or priority of the neutral order and/or price-improvement orders based on the neutral order's remaining position size limit.

11. The method of claim 10, wherein the maintaining of the neutral order's priority in the stack comprises preventing the total size of the orders existing in front of the received neutral order from exceeding the position size limit.

12. The method of claim 10, wherein maintaining the neutral price improvement order's priority in the relative position comprises preventing the total size of the orders existing in front of the received neutral price improvement order from exceeding the position size limit.

13. The method of claim 10, further comprising the step of:
as a consequence of removal of an order in front of the neutral order from the stack, promoting a priority of at least a portion of a price improvement order from behind the neutral order to go in front of the neutral order, at a size corresponding to the removed order thereby to preserve the priority of the neutral order relative to the position size limit.

14. The method of claim 13, further comprising the step of:
splitting the price improvement order to be promoted over the neutral order into at least first and second price improvement orders; and
promoting the portion of the price improvement order corresponding to the size of the removed order over the neutral order.

15. The method of claim 10, further comprising the step of:
reducing the neutral order's position size limit by the size, or portion thereof, as a consequence of cancellation of an order in front of the neutral order.

16. The method of claim 10, further comprising the step of:
reducing the neutral order's position size limit by the size, or portion thereof, as orders in front of the neutral order as they are matched.

17. A method comprising the steps of:
in a computer of an electronic trading system, managing a trading stack of orders for items of a class, the trading system providing a standard price increment for prices of the orders and a price improvement protocol for managing and/or matching price-improvement orders, price-improvement orders being orders that the electronic trading system manages and/or matches at prices between the standard increment prices;
receiving an order to trade the item designated as a neutral order, a neutral order being a price-improvement order managed in the priority stack automatically by a computer of the electronic trading system under a protocol including at least the following conditions:
the neutral order is assigned a position size limit, being a size computed by the electronic trading system based on cumulative size of orders that meet criteria specified in trading rules of the trading system, pending on the same side of the market at the time that the neutral order is received into the priority stack; and
the priority of the neutral order in the priority stack is maintained against the price improvement order(s) received after the neutral order that are submitted with higher priority than the neutral order, with the neutral order reaching its maximum position in the priority stack when the position size limit is exhausted, the neutral order's position size limit being decremented as orders are traded or cancelled off the stack, by the trading system automatically altering the price and/or priority of the neutral order and/or price-improvement orders based at least in part on the remaining position size limit of the neutral order.

18. The method of claim 17, wherein:
the electronic trading system assigns the position size limit to the neutral order based on a total of the size of the order(s) on the same side of the priority stack as the neutral order and having higher priority than the neutral order existing in the stack at the time that the neutral order is received.

19. The method of claim 17, further comprising the steps of:
reducing the position size limit for the neutral order by a traded portion of a size of orders in front of the neutral order as they are traded.

20. The method of claim 17, further comprising the step of:
as a consequence of removing an order in front of the neutral order in the stack because the order in front is matched with a contra side order or cancelled, promoting a priority of at least a portion of a price improvement order from behind the neutral order to go in front of the neutral order, at a size corresponding to the removed order thereby to preserve the priority of the neutral order relative to the position size limit.

21. The method of claim 20, further comprising the step of:
splitting the price improvement order to be promoted over the neutral order into at least first and second price improvement orders; and
promoting the portion of the price improvement order corresponding to the size of the removed order over the neutral order.

22. The method of claim 17, further comprising the step of:
reducing the neutral order's position size limit by the size, or portion thereof, of an order in front of the neutral order as a consequence of cancellation of the order in front of the neutral order.

23. The method of claim 17, wherein:
maintaining the neutral order's priority in the stack comprises reducing the position size limit in the event of a trade or cancellation of at least a portion of at least one of the received orders.

24. The method of claim 17, wherein:
maintaining the neutral order's priority in the stack further comprises not reducing the position size limit in the event of a trade or cancellation of at least a portion of at least one of the received orders.

25. The method of claim 17, further comprising the steps of:
switching at least a portion of the size of an order received after the neutral order to be switched with at least a portion of the size of an order received prior to the neutral order, the switching maintaining the position size limit.

* * * * *